(12) United States Patent
Smith et al.

(10) Patent No.: US 12,316,584 B1
(45) Date of Patent: May 27, 2025

(54) APPARATUS AND A METHOD FOR THE GENERATION AND IMPROVEMENT OF A CONFIDENCE FACTOR

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/406,463

(22) Filed: Jan. 8, 2024

(51) Int. Cl.
*H04L 51/02* (2022.01)
*G06F 3/01* (2006.01)

(52) U.S. Cl.
CPC .............. *H04L 51/02* (2013.01); *G06F 3/013* (2013.01)

(58) Field of Classification Search
CPC ................................ H04L 51/02; G06F 3/013
See application file for complete search history.

(56) References Cited

U.S. PATENT DOCUMENTS

| | | | |
|---|---|---|---|
| 9,846,844 B2 | 12/2017 | Hecht et al. | |
| 11,936,947 B2* | 3/2024 | Ramirez | G10L 15/26 |
| 2006/0017978 A1 | 1/2006 | Minamino et al. | |
| 2011/0158524 A1 | 6/2011 | Ohba et al. | |
| 2013/0267204 A1* | 10/2013 | Schultz | G06F 21/32 |
| | | | 455/411 |
| 2014/0067730 A1* | 3/2014 | Kozloski | G16H 20/70 |
| | | | 706/12 |
| 2015/0121292 A1* | 4/2015 | Blanco | G06F 16/284 |
| | | | 715/780 |
| 2017/0372225 A1 | 12/2017 | Foresti | |
| 2018/0146089 A1* | 5/2018 | Rauenbuehler | H04M 1/72469 |
| 2019/0108275 A1 | 4/2019 | Gulli et al. | |

(Continued)

FOREIGN PATENT DOCUMENTS

| | | |
|---|---|---|
| CN | 113570481 A | 10/2021 |
| KR | 1020150053317 A | 5/2015 |

OTHER PUBLICATIONS

Khanbabaei, "Applying clustering and classification data mining techniques for competitive and knowledge-intensive processes improvement," 2019, Knowledge and Process Management, vol. 26, pp. 123-129 (Year: 2019).

*Primary Examiner* — Viet D Vu
(74) *Attorney, Agent, or Firm* — Caldwell Intellectual Property Law

(57) ABSTRACT

An apparatus for the generation and improvement of confidence factor is disclosed. The apparatus comprises at least a processor and a memory communicatively connected to the at least a processor. The memory instructs the processor to receive a user profile from a user, wherein the user profile comprises physiological data. The memory instructs the processor to generate an industrial prompt as a function of the user profile. The memory instructs the processor to identify physiological response data as a function of the industrial prompt and the plurality of physiological data. The memory instructs the processor to determine a confidence factor as a function of the biometric response data. The memory instructs the processor to generate confidence improvement data as a function of the confidence factor. The memory instructs the processor to display the confidence improvement data using a display device.

18 Claims, 10 Drawing Sheets

(56) References Cited

U.S. PATENT DOCUMENTS

| | | |
|---|---|---|
| 2019/0250782 A1* | 8/2019 | Ramachandra ......... G06T 13/40 |
| 2020/0333875 A1* | 10/2020 | Bansal .................. G06F 9/3836 |
| 2021/0383261 A1 | 12/2021 | Hanna et al. |
| 2022/0004964 A1 | 1/2022 | Essafi et al. |
| 2022/0095974 A1 | 3/2022 | Southern et al. |
| 2022/0245557 A1 | 8/2022 | Minter et al. |
| 2022/0247700 A1* | 8/2022 | Bhardwaj .............. G06N 3/044 |
| 2022/0374812 A1 | 11/2022 | Riedl |
| 2022/0405313 A1* | 12/2022 | Banipal .................... G06N 5/02 |
| 2023/0032131 A1 | 2/2023 | Harper et al. |
| 2023/0036730 A1 | 2/2023 | Casa |

\* cited by examiner

APPARATUS AND A METHOD FOR THE GENERATION AND IMPROVEMENT OF A CONFIDENCE FACTOR

FIELD OF THE INVENTION

The present invention generally relates to the field of artificial intelligence. In particular, the present invention is directed to an apparatus and a method for the generation and improvement of a confidence factor.

BACKGROUND

Computing devices have struggled to identify information associated with a user. Inaccurate harvesting of information from a user has led to an inaccurate prediction of details associated with a user. Accurate predictions of confidence factors have long been an inexact science that has led to myriad of problems for the user.

SUMMARY OF THE DISCLOSURE

In one aspect, an apparatus for the generation and improvement of confidence factors is disclosed. The apparatus includes at least a processor and a memory communicatively connected to the at least a processor. The memory instructs the processor to receive a user profile from a user, wherein the user profile comprises physiological data. The memory instructs the processor to generate an industrial prompt as a function of the user profile. The memory instructs the processor to identify physiological response data as a function of the industrial prompt and the plurality of physiological data. The memory instructs the processor to determine a confidence factor as a function of the biometric response data. The memory instructs the processor to generate confidence improvement data as a function of the confidence factor. The memory instructs the processor to display the confidence improvement data using a display device.

In another aspect, a method for the generation and improvement of a confidence factor is disclosed. The method includes receiving, using at least the processor, a user profile from a user, wherein the user profile comprises physiological data. The method includes generating, using the at least the processor, an industrial prompt as a function of the user profile. The method includes identifying, using the at least the processor, physiological response data as a function of the industrial prompt and the plurality of physiological data. The method includes determining, using the at least the processor, a confidence factor as a function of the biometric response data. The method includes generating, using the at least the processor, confidence improvement data as a function of the confidence factor. The method includes displaying, using a display device, the confidence improvement data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus, and a method for the generation and improvement of confidence factor is disclosed. The apparatus comprises at least a processor and a memory communicatively connected to the at least a processor. The memory instructs the processor to receive a user profile from a user, wherein the user profile comprises physiological data. The memory instructs the processor to generate an industrial prompt as a function of the user profile. The memory instructs the processor to identify physiological response data as a function of the industrial prompt and the plurality of physiological data. The memory instructs the processor to determine a confidence factor as a function of the biometric response data. The memory instructs the processor to generate confidence improvement data as a function of the confidence factor. The memory instructs the processor to display the confidence improvement data using a display device. Exemplary embodiments illustrating aspects of the present disclosure are described below in the context of several specific examples.

Figure 1:
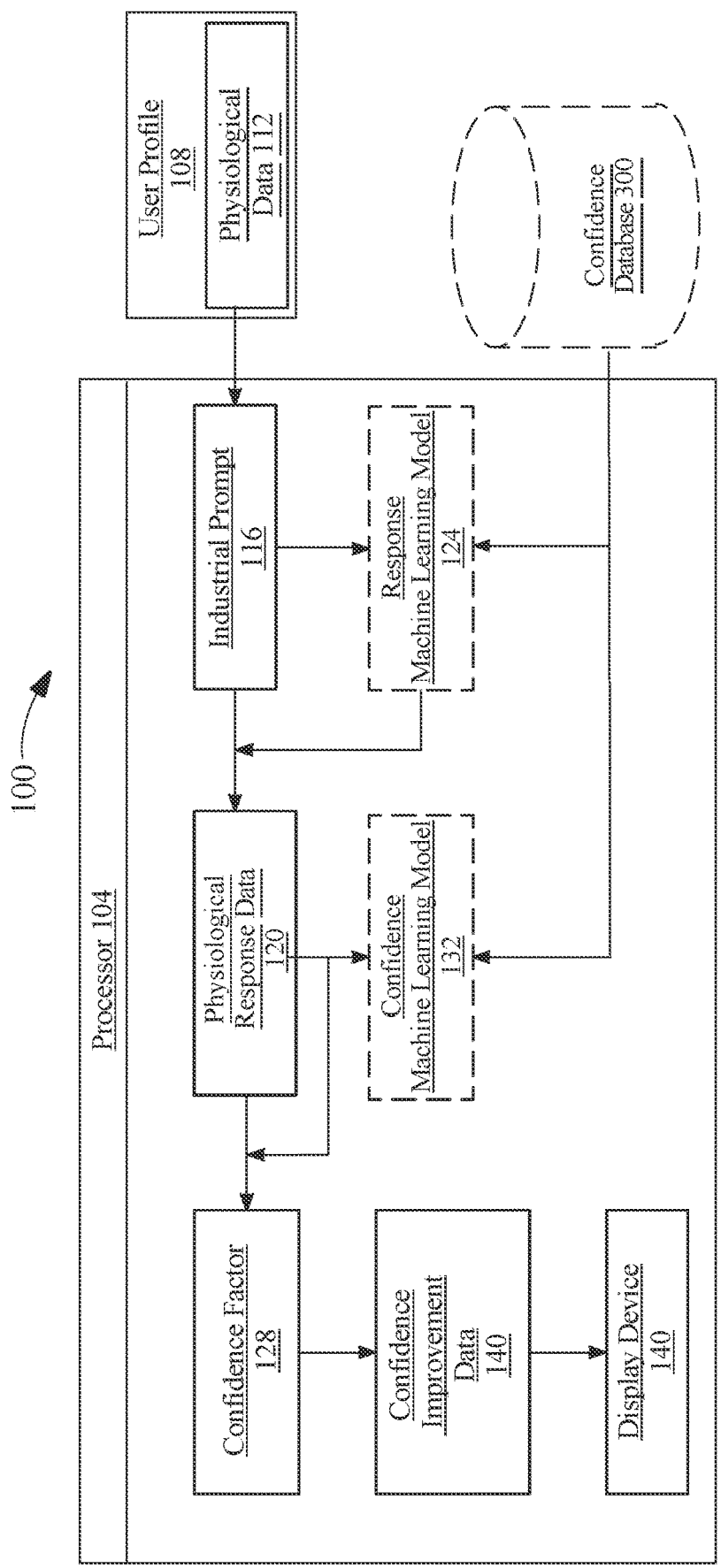
FIG. 1 is a block diagram of an exemplary embodiment of an apparatus for the generation and improvement of a confidence factor.

Referring now to FIG. 1, an exemplary embodiment of apparatus 100 for the generation and improvement of a confidence factor is illustrated. Apparatus 100 includes a processor 104. Processor 104 may include any computing device as described in this disclosure, including without limitation a microcontroller, microprocessor, digital signal processor (DSP), and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the user, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to extract a user profile 108 from a user. For the purposes of this disclosure, a "user profile" is a representation of information and/or data associated with a user. A user profile 108 may be made up of a plurality of user data. As used in the current disclosure, "user data" is information associated with the user. A user profile 108 may be created by a processor 104, a user, or a third party. The user profile 108 may include any of the following personal information: age, weight, height, gender, credit, geographical location, financial information, criminal history, medical history, marital status, relationship history, familial history, a confidence evaluation, user goals, business goals, insecurities of the user, and the like. A user profile 108 may include information about things and topics a user feels confident/unconfident about. This may include topics related to the user's profession, industry, job function, social status, public speaking ability, personal/professional networking capabilities, and the like. A user profile 108 may additionally include information regarding the user's occupation. This may include the user's job title, salary, net worth, debts, revenue, gross income, net income, business debts, a list of business expenses, accounting information, and the like. User data may include health data. used in the current disclosure, "health data" is an element of data that is related to a user's current health. Health data may include test results, medical records, family medical history, list of medical conditions, physician notes, medical facility records, and the like. In a non-limiting example, the user profile may be the same or substantially the same as the entity profile described in U.S. patent application Ser. No. 18/141,320, filed on Apr. 28, 2023, titled "METHOD AND APPARATUS FOR ROUTINE IMPROVEMENT FOR AN ENTITY," which is incorporated by reference herein in its entirety.

With continued reference to FIG. 1, a user profile 108 may include mindset data. As used in the current disclosure, "mindset data" is information and insights surrounding the user's mindset. The mindset of a user may refer to the mental perspective, attitudes, beliefs, and expectations that an individual brings to a particular situation or experience, especially in the context of using a product, service, or technology. Mindset data may include the information about the user's confidence. Mindset data may include the information about the user's values, biases, and overall mental framework. Mindset data may involves information about how the users thinks and perceives the world around them. This data can be gathered through various methods, including surveys, interviews, observations, and psychological assessments. Mindset data may include the user's mindset regarding goals or objectives, expectations, attitudes and beliefs, knowledge and experiences, emotions, and the like.

With continued reference to FIG. 1, user profile 108 may include user habits. User habits may refer to the patterns of behavior that individuals develop in their interactions with products, services, or technology over time. These habits may be formed through repeated actions and become automatic or ingrained behaviors. User habits may include any routine behaviors. User profile 108 may also include information about a user's triggers to their habits. Habits may have triggers that prompt users to perform a specific action. Triggers can be external cues (e.g., receiving a notification) or internal cues (e.g., feeling hungry). Triggers initiate the behavior associated with the habit.

With continued reference to FIG. 1, user profile 108 may include physiological data 112 associated with the user(s). As used in the current disclosure, "physiological data" is any information related to the biological signals generated by a user. Biological signals are electrical, chemical, or mechanical signals that are produced by living organisms as a result of various physiological processes. These signals can be measured and analyzed to gain insights into the functioning of biological systems and to diagnose and treat medical conditions. Examples of biometric signals may include electrocardiogram (ECG), electromyogram (EMG), electroencephalogram (EEG), blood pressure, respiration rate, hormone levels, blood glucose levels, eye movement, and the like. Physiological data 112 may include chemical, biological, physical, and behavioral data relating to a user. Physiological data 112 may include information regarding a user's health including medical history, user diet, exercise, sleep, family medical history, and the like. In other embodiments, physiological data 112 may include information collected from a standard health screening such as X-rays, MRI, blood test, lab tests, examinations, and the like. In some embodiments, physiological data 112 may be extracted from a user using at least one sensor. Physiological data may include information such as perspiration rate, eye tracking, breathing rate, heart rate, user movement (i.e. nervous twitches, leg bounce, fidgeting, etc.), and the like.

With continued reference to FIG. 1, apparatus 100 may include a sensor to detect physiological data 112. As used in this disclosure, a "sensor" is a device that produces an electrical output signal for purpose of sensing and monitoring biological events or changes in its environment. In some embodiments, the sensor may include one or more processors that perform one or more processing steps as described in this disclosure. In some cases, the sensor may include, without limitation, a temperature sensor, EMG sensor, ECG sensor, airflow sensor, glucometer sensor, pressure sensor, acoustic sensor, image sensor, magnetic field sensor, movement sensor, eye tracker, and the like thereof. In some embodiments, without limitation, the sensor may include a physical sensor, wherein the physical sensor is a device that measures a physical quantity. In some cases, the sensor may convert physical quantity into an output signal which can be read by processor 104. In some embodiments, without limitation, sensor may include a chemical sensor, wherein the chemical sensor is a device that converts a property of a particular analyte into a measurable signal that is proportional to the analyte concentration. In some cases, a chemical sensor may recognize an analyte molecule in a selective way by transforming it into an analytical electrical signal. In some cases, analyte concentration may include, without limitation, PH value, Ca+ concentration, the glucose concentration of body liquid and the like thereof. In some embodiments, without limitation, sensor may include a biosensor, wherein the biosensor is a device that combine biological material with a suitable platform for a detection of pathogenic organisms, carcinogenic, mutagenic, toxic chemicals or for reporting a biological effect. In some cases, a sensor may include, without limitation, a biosensor, electrochemical biosensor, physical biosensor, optical biosensor, wearable biosensor, and the like thereof.

With continued reference to FIG. 1, a processor 104 may extract user data from a user using a wearable device. As used in the current disclosure, a "wearable device" is a computing device that is designed to be worn on a user's body or clothing. The wearable device may detect physiological data 112, user data, or wearable device data. In embodiments, a wearable device may include a smart watch, smart ring, fitness tracking device, smart glasses, and the like. As used in the current disclosure, "wearable device data" is data collected by a wearable device. Wearable device data may include data and associated analysis corresponding to, for instance and without limitation, accelerometer data, pedometer data, gyroscope data, electrocardiography (ECG) data, electrooculography (EOG) data, bioimpedance data, blood pressure and heart rate monitoring, oxygenation data, biosensors, fitness trackers, force monitors, motion sensors, video and voice capture data, social media platform data, and the like. User profile 108 may be provided by a user or a second individual on behalf of a user, for instance and without limitation a physician, medical professional, nurse, hospice care worker, mental health professional, and the like. User profile 108 may originate from a user questionnaire, graphical user interface (GUI), or any other suitable forum for gathering information regarding user data. Persons skilled in the art, upon review of this disclosure in its entirety, will be aware of the various ways in which user data may be collected and provided to the system described herein.

With continued reference to FIG. 1, at least a processor 104 may receive physiological data 112 using an eye tracking system. In some embodiments, the eye tracking systems may be head-mounted, some may require the head to be stable, and some may function remotely and automatically track the head during motion. In some embodiments, the eye tracking system may include at least an eye sensor. As used in this disclosure, an "eye sensor" is any system or device that is configured or adapted to detect an eye parameter as a function of an eye phenomenon. In some cases, at least an eye sensor may be configured to detect at least an eye parameter as a function of at least an eye phenomenon. As used in this disclosure, an "eye parameter" is an element of information associated with an eye. Exemplary non-limiting eye parameters may include blink rate, eye-tracking parameters, pupil location, gaze directions, pupil dilation, and the like. Exemplary eye parameters are described in greater detail below. In some cases, an eye parameter may be transmitted or represented by an eye signal. An eye signal may include any signal described in this disclosure. As used in this disclosure, an "eye phenomenon" may include any observable phenomenon associated with an eye, including without limitation focusing, blinking, eye-movement, and the like. Eye sensor may include any sensor described in this disclosure. In some embodiments, at least an eye sensor may include an electromyography sensor. Electromyography sensor may be configured to detect at least an eye parameter as a function of at least an eye phenomenon.

With continued reference to FIG. 1, images of eyes may be captured by a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object (e.g., a user or user's eyes). In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

With continued reference to FIG. 1, an exemplary camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video. Persons skilled in the art, upon reviewing the entirety of this disclosure, will be aware of various types of cameras that may be used for the disclosure.

With continued reference to FIG. 1, in some cases, a camera may be used to determine eye patterns (e.g., track eye movements). For instance, camera may capture images and processor (internal or external) to camera may process images to track eye movements. In some embodiments, a video-based eye tracker may use corneal reflection (e.g., first Purkinje image) and a center of pupil as features to track over time. A more sensitive type of eye-tracker, a dual-Purkinje eye tracker, may use reflections from a front of cornea (i.e., first Purkinje image) and back of lens (i.e., fourth Purkinje image) as features to track. A still more sensitive method of tracking may include use of image features from inside eye, such as retinal blood vessels, and follow these features as the eye rotates. In some cases, optical methods, particularly those based on video recording, may be used for gaze-tracking and may be non-invasive and inexpensive.

With continued reference to FIG. 1, a user profile 108 may be received by processor 104 via user input. For example, and without limitation, the user or a third party may manually input user profile 108 using a graphical user interface of processor 104 or a remote device, such as for example, a smartphone or laptop. The user profile 108 may additionally be generated via the answer to a series of questions. The series of questions may be implemented using a chatbot, as described herein below. A chatbot may be configured to generate questions regarding any element of the user profile 108. In some embodiments, chatbot may be configured to generate questions regarding missing elements of user profile 108. In a non-limiting embodiment, a user may be prompted to input specific information or may fill out a questionnaire. In an embodiment, a graphical user interface may display a series of questions to prompt a user for information pertaining to the user profile 108. The user profile 108 may be transmitted to processor 104, such as via a wired or wireless communication, as previously discussed in this disclosure. The user profile 108 can be retrieved from multiple sources third-party sources including the user's inventory records, financial records, human resource records, past user profiles 108, sales records, user notes and observations, and the like. A user profile may be placed through an encryption process for security purposes.

With continued reference to FIG. 1, a user profile 108 may include user records. As used in the current disclosure, a "user record" is a document that contains information regarding the user. User records may include user credentials, reports, financial records, medical records, business records, Asset inventory, and government records (i.e. birth certificates, social security cards, and the like). A user record may additionally include an employee record. An employee record may include things like employee evaluations, human resource records, client files, invoices, timecards, driver's license databases, news articles, social media profiles and/or posts, and the like. User records may be identified using a web crawler. User records may include a variety of types of "notes" entered over time by the user, employees of the user, support staff, advisors, and the like. User records may be converted into machine-encoded text using optical character recognition (OCR).

Still referring to FIG. 1, in some embodiments, optical character recognition includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, user profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the user profile 108 and user data. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract user records, inventory records, financial records, human resource records, past user profiles 108, sales records, user notes, and observations, based on criteria such as a time, location, and the like.

With continued reference to FIG. 1, processor 104 is configured to generate an industrial prompt 116 as a function of the user profile 108. As used in the current disclosure, an "industrial prompt" is a prompt that represents a scenario related to the user. An industrial prompt 116 may be related to the user industry, profession, job title, social status, personal goals, business goals, and the like. An industrial prompt may cover a variety of industrial topics. Examples of industrial topics may include networking, testing the user's industrial knowledge, meeting with clients, acquiring new clients, social conversations, and the like. In a non-limiting example, an industrial prompt 116 may include questions, hypothetical scenario, interpersonal communications, presentations, verbal tests, written tests, speaking engagements, speaking panels, and the like. An industrial prompt 116 may be displayed to the user using a display device. An industrial prompt 116 may include a staged or hypothetical scenario for a user. This scenario may force the user to speak to other third parties in a professional setting or a social setting. The scenario may include an employment interview, a speaking engagement, a networking opportunity, a client meeting, a social conversation, a romantic conversation, a professional conversation, and the like. In an embodiment, an industrial prompt 116 may include a requirement, such as requiring a user to achieve an objective during the conversation. An objective may include securing a business deal, creating a networking connection, creating a social connection, creating a romantic connection, being an engaging speaker, developing an elevator pitch, the like. The third party may be an actor or it may include a computer-generated digital avatar. As used in the current disclosure, a "digital avatar" is a virtual representation of a person or a character in a digital environment. A digital avatar may take many forms, such as a 2D image, a 3D model, or even an animated character. In an embodiment, a digital avatar may be customized to have specific features that the user desires. In an embodiment, a digital avatar may be used to represent a person who is important to the user. This may include a manager, senior leadership, c-suite executives, a dating partner, a family member, an authoritative figure, networking connections, an interviewer, an interviewee, potential clients, current clients, and the like. A digital avatar may be displayed to the user using a display device, as mentioned in greater detail herein below. In some embodiments, a digital avatar may be displayed to the user in augmented reality (AR), virtual reality (VR), and the like. An industrial prompt 116 may be used to simulate a conversation with a person. The topic of these conversations may include any industrial prompt. A processor 104 may generate an industrial prompt 116 by comparing the current user profile 108 to historical industrial prompts. This may be done using a machine learning model, classifier, look-up table, or a chatbot as disclosed herein. In an embodiment, a user profile 108 indicates that a user desires to be more confident in while networking. Processor 104 may query a database, such as database 300, for information regarding historical industrial prompts for user's who are similar to the current user based on their current networking skills and profession. In response to this query processor 104 may generate a hypothetical networking scenario using a digital avatar. The scenario may have an objective such as exchanging contact information and making a positive impression on the third-party.

With continued reference to FIG. 1, processor 104 may be configured to generate an industrial prompt 116 using an industrial machine learning model. As used in the current disclosure, an "industrial machine learning model" is a type of machine learning model that is configured to generate an industrial prompt 116 using a mathematical and/or algorithmic representation of a relationship between inputs and outputs. In some embodiments, an industrial machine learning model may comprise a classifier. An industrial machine learning model may be consistent with the machine learning model described below in FIG. 2. Inputs to the machine learning model may include user profile 108, physiological data 112, examples of industrial prompts 116, and the like. This data may be received from a database, such as database 300. An example of industrial prompts 116 may be generated from or chosen from past iterations of the industrial prompts 116. An industrial machine learning model may be trained using industrial training data. Industrial training data is a plurality of data entries containing a plurality of inputs that are correlated to a plurality of outputs for training a processor 104 by a machine-learning process. Industrial training data may comprise a user profile 108 correlated to an example of an industrial prompt 116. In embodiments, industrial training data may be updated iteratively as a function of the input and output of the industrial machine learning model on a feedback loop. Industrial training data may include user profile 108, physiological data 112, industrial prompts 116, examples of digital avatars, the output of the operational model, the output of the language model, and the like. Industrial training data may be stored in a database, such as a training data database, remote data storage device, or user input or device.

Still referring to FIG. 1, a digital avatar may be a digital representation of a single person or an aggregate of a plurality of people. In a non-limiting example, a digital avatar may be used to simulate a digital audience while the user is participating in a public speaking engagement. A digital avatar may be represented visually or in text. In some embodiments, a digital avatar may comprise a chatbot. Digital avatar may include one or more animation files and/or video clips. Digital avatar may include one or more files and/or video clips of a real or hypothetical person. Digital avatar may be configured to respond to an inquiry from a user. A Digital avatar may take the form of digital video or other visuals to apply the industrial prompt 116 to the user. Digital avatar may be a slideshow, video, or physical replication of the user as a function of the industrial prompt 116. Digital avatar may comprise a "plurality of video elements," which are, as used in this disclosure, diverse types of features from a digital avatar such as image features, frame features, sound features, graphical features, and the like. Generation of digital avatar may include generation thereof using a machine-learning training algorithm and avatar training data, for instance by training a machine-learning model using avatar training data and a machine-learning algorithm as described in further detail below. Machine learning algorithms may include unsupervised machine learning algorithms such as clustering models, k-means clustering, hierarchical clustering, anomaly detection, local outlier factor, neural networks and the like. Machine-learning may include supervised machine learning algorithms using institutional training data. Machine-learning algorithm may train one or more neural networks such as convolutional and/or deep learning networks and are discussed more herein with reference to FIG. 2.

Still referring to FIG. 1, in some embodiments, processor 104 may be configured to apply the industrial prompt 116 to the user using automatic speech recognition. Automatic speech recognition may require training (i.e., enrollment). In some cases, training an automatic speech recognition model may require an individual speaker to read text or isolated vocabulary. In some cases, a solicitation video may include an audio component having audible verbal content, the contents of which are known a priori by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Alternatively or additionally, in some cases, processor 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from the audio content, rather than what the speaker is saying. In some cases, processor 104 may first recognize a speaker of verbal audio content and then automatically recognize the speech of the speaker, for example by way speaker-dependent automatic speech recognition model or process. In some embodiments, an automatic speech recognition process can be used to authenticate or verify an identity of a speaker. In some cases, a speaker may or may not include a subject. For example, the subject may speak within the solicitation video, but others may speak as well.

Still referring to FIG. 1, in some embodiments, an automatic speech recognition process may include one or all of the acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech Recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right contexts may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum probability estimate of a most likely sequence of hidden states (i.e., Viterbi path) that results in a sequence of observed events. Viterbi algorithms may be employed in the context of Markov information sources and hidden Markov models. A Viterbi algorithm may be used to find the best path, for example using a dynamically created combination hidden Markov model, having both acoustic and language model information, using a statically created combination hidden Markov model (e.g., finite state transducer [FST] approach).

Still referring to FIG. 1, in some embodiments, an automatic speech recognition process may employ dynamic time warping (DTW)-based approaches. Dynamic time warping may include algorithms for measuring the similarity between two sequences, which may vary in time or speed. For instance, similarities in walking patterns would be detected, even if in one video the person was walking slowly and if in another he or she were walking more quickly, or even if there were accelerations and decelerations during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow processor 104 to find an optimal match between two given sequences (e.g., time series) with certain restrictions. That is, in some cases, sequences can be "warped" non-linearly to match each other. In some cases, a DTW-based sequence alignment method may be used in the context of hidden Markov models.

Still referring to FIG. 1, in some embodiments, an automatic speech recognition process may include a neural network. A neural network may include any neural network disclosed herein, for example, those disclosed with reference to FIGS. 2 and 4-5. In some cases, neural networks may be used for automatic speech recognition, including phoneme classification, phoneme classification through multi-objective evolutionary algorithms, isolated word recognition, audiovisual speech recognition, audiovisual speaker recognition, and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time intervals, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, processor 104 may be configured to generate digital avatar. Apparatus 100 may generate a digital avatar through one or more modeling software components, modules, and/or products, such as, but not limited to, Sketchup, Blender, ZBrus h, AutoCAD, SolidWorks, 3Ds Max, Maya, Rhino3d, CATIA, and the like. In some embodiments, digital avatar. may include one or more formats, such as, but not limited to, "dwg," "dxf," "3ds", "dae", "dem", "def", "ife", "kmz", "stl", "3dxml", "3dm", "3d", "cd", "vda", "vrml", and the like.

Still referring to FIG. 1, in some embodiments, digital avatar may be generated using an operational model. An "operational model" as used in this disclosure is a computer process that dictates animations and/or interactions of one or more virtual entities and a user. An operational model may be programmed to make a digital avatar to perform one or more tasks, movements, conversations, and the like. In some embodiments, an operational model may comprise behavioral parameters corresponding to animations of digital avatar. "Behavioral parameters" as used in this disclosure are metrics associated with interactions of a digital avatar. Behavioral parameters may include, but are not limited to, facial animations, responsiveness, interaction with an environment, and the like. Facial animations may include, but are not limited to, grinding teeth, smirking, crying, laughing, clenching, grinding teeth, showing surprise, and the like. In some embodiments, behavioral parameters may be tuned as a function of an avatar body of digital avatar. In other embodiments, behavioral parameters may be consistent throughout multiple varying avatar models. In some embodiments, facial animations of behavioral parameters may be tuned to an avatar body.

Still referring to FIG. 1, operational model may include one or more animations and/or triggers of animations of digital avatar. Animations may include, but are not limited to, walking, running, jumping, hiding, celebrating, nodding, and the like. Triggers of animations may include, but are not limited to, geographical positions, user input, engagement with virtual objects, and the like. For instance and without limitation, digital avatar may include an animation of the digital avatar in a networking setting such as a cocktail hour. Animations and triggers of animations of operational model may be based on user profile 108, user data, industrial prompts 116, and/or other factors. In some embodiments, apparatus 100 may include a behavioral machine learning model. In some embodiments, operational model may include the behavioral machine learning model. A behavioral machine learning model may be trained with training data correlating user data to behavioral parameters. In some embodiments, the processor may be configured to train the behavioral machine learning model. Training data may be received through user input, external computing devices, and/or through previous iterations of processing. In some embodiments, training data may be received from a database, such as a training data database. In some embodiments, the behavioral machine learning model may be configured to receive user data as input and output one or more behavioral parameters. Operational model may use the behavioral machine learning model to determine behavioral parameters of digital avatar based on user profile 108 or physiological data 116. In some embodiments, animation may be generated using stored rules for representation and/or modification of static images. Stored rules may include, without limitation, rules associating an event as detected by sensing devices with an image and/or sound representing a reaction thereto by an animated character. For instance, a given event and/or input may be associated with an endpoint image, such as a "congratulatory" event with an image of an avatar with congratulating the user for making a new networking connection. Similar associations may be made between expressions and/or poses indicating simulated reactions to pleasing events, exciting events, annoying events, humorous events. Animated sequences may be stored transitioning from a first pose representing a first simulated emotional state and/or response and a second pose representing a second simulated emotional state and/or response. Alternatively or additionally, stored rules may indicate modifications to images and/or for creation of transitional images that can be used to generate an animated sequence of images from one simulated emotional state and/or response. Emotional states and/or responses may be regulated, without limitation, using a finite state machine directing transition from one emotional state and/or response to another.

Still referring to FIG. 1, stored rules, modified images, and/or modifications to images may be entered and/or defined manually; alternatively or additionally, modified images, and/or modifications to images may be generated using a machine-learning process that may be trained using manually generated images, modifications thereto, and/or sequences of such images and/or modifications, and/or manually identified examples of such training examples in existing animated and/or live-action stills and/or sequences. Machine-learning models may include models trained to recognize features in a picture of a character, models trained to modify identified features and/or entire images, models trained to identify and/or generate transitional images traversing from one static image to another static image in a sequence, or the like. Static images and/or modifications may be associated with responses to particular inputs by additional models.

Still referring to FIG. 1, digital avatar may be able to speak using a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In embodiments, corpus documents may include any element of data disclosed herein, including user profile 108, physiological data 112, industrial prompts 116, and the like. Corpus documents may additionally include questions and answers from a chatbot, user input, or a third-party input. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, processor 104 may be configured to generate a digital avatar using an avatar machine learning model. As used in the current disclosure, a "avatar machine learning model" is a type of machine learning model that is configured to generate a digital avatar using a mathematical and/or algorithmic representation of a relationship between inputs and outputs. In some embodiments, an avatar machine learning model may comprise a classifier. An avatar machine learning model may be consistent with the machine learning model described herein below in FIG. 2. Inputs to the machine learning model may include user profile 108, physiological data 112, industrial prompts 116, examples of digital avatars, the output of the operational model, the output of the language model, and the like. This data may be received from a database, such as database 300. An example of a digital avatar may come from past iterations of the digital avatar. An avatar machine learning model may be trained using avatar training data. Avatar training data is a plurality of data entries containing a plurality of inputs that are correlated to a plurality of outputs for training a processor 104 by a machine-learning process. Avatar training data may comprise industrial prompts 116 correlated to examples of a digital avatar or elements of a digital avatar. In embodiments, avatar training data may be updated iteratively as a function of the input and output of the avatar machine learning model on a feedback loop. Avatar training data may include user profile 108, physiological data 112, industrial prompts 116, examples of digital avatars, the output of the operational model, the output of the language model, and the like. Avatar training data may be stored in a database, such as a training data database, remote data storage device, user input, or device.

With continued reference to FIG. 1, processor 104 is configured to identify physiological response data 120 as a function of the industrial prompt 116 and the plurality of physiological data 112. As used in the current disclosure, "biometric response data" is an element of data related to the user's physiological data's response to an industrial prompt. As the industrial prompt 116 is displayed to a user, the user may respond in a written or verbal manner. Physiological response data 120 may be users biometric signal while engaged in the industrial prompt 116. Additionally, physiological response data 120 may comprise a comparison of the user's biometric signals during the industrial prompt 116 to the user's baseline biometric signals as represented by physiological data 112. Biological response data 120 may additionally comprise a comparison of the users current biometric signal during the current industrial prompt 116 as compared to past biometric signals to historical industrial prompts 116. Physiological response data 120 may be displayed using a numerical score, one or more graphics, linguistic variables, trendlines, and the like. Examples of biometric signals may include electrocardiogram (ECG), electromyogram (EMG), electroencephalogram (EEG), blood pressure, respiration rate, hormone levels, blood glucose levels, eye movement, user movement, eye parameters, and the like. Physiological response data 120 may include chemical, biological, physical, and behavioral data relating to a user. Physiological response data 120 may also include information such as perspiration rate, eye tracking, breathing rate, heart rate, user movement (i.e. nervous twitches, leg bounce, fidgeting, etc.), and the like. A plurality of sensors may be used to detect the physiological response data 120. A physiological response data 120 may include any information related to the biological signals generated by a user while the user is engaged in the industrial prompt 116. Engaging in the industrial prompt may include any time the user is preparing to engage or actively engaged with the industrial prompt. This may include any time the user is responding to a digital avatar, a question, and the like. To detect physiological response data 120 a user may wear a wearable device while speaking to the digital avatar or responding to the question. In another embodiment, a plurality of sensors may be configured to surround the users while he/she is engaged with the industrial prompt 116. Physiological response data 120 may be taken for each question that the user responds to. In an embodiment, physiological response data 120 may be classified by topic, industrial category, types of responses, and the like.

With continued reference to FIG. 1, processor 104 may generate the physiological response data 120 using a response machine-learning model 124. As used in the current disclosure, a "response machine-learning model" is a machine-learning model that is configured to generate physiological response data 120. Response machine-learning model 124 may be consistent with the classifier described below in FIG. 2. Inputs to the response machine-learning model 124 may include user profile 108, physiological data 112, industrial prompts 116, digital avatars, examples of physiological response data 120, and the like. Outputs to the response machine-learning model 124 may include physiological response data 120. Response training data is a plurality of data entries containing a plurality of inputs that are correlated to a plurality of outputs for training a processor by a machine-learning process. In an embodiment, response training data may comprise a plurality of physiological data 112 and industrial prompts 116 correlated to a plurality of examples of physiological response data 120. Response training data may be received from database 300. Response training data may contain information regarding user profiles 108, physiological data 112, industrial prompts 116, digital avatars, examples of physiological response data 120, and the like. Machine learning model may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 is configured to determine a confidence factor 128 as a function of the physiological response data 120. As used in the current disclosure, a "confidence factor" is a quantitative measurement of the user's outward appearance of confidence. A confidence factor 128 may include a numerical value or percentage that represents the level of confidence that one has in a particular decision, result, or outcome. In a non-limiting example, a seasoned public speaker may have a high confidence factor going into a presentation if they have prepared well, have experience in public speaking, and feel confident in their ability to deliver a good speech. In an embodiment, a confidence factor 128 may be determined by the user's pattern of speech, this may include stuttering, stammering, stalling, and the like. A confidence factor of 128 may additionally be determined by the user's posture and eye contact. For example, the less eye contact a user makes with a digital avatar the more likely it is the user will receive a lower confidence score. A confidence factor may be lowered if the user's perspiration rate or respiration rate increases significantly while engaged with the industrial prompt 116. A user's confidence factor may increase if the user appears to be knowledgeable and personable while engaged with the industrial prompt. In some embodiments, a confidence factor 128 may refer to an individual's level of confidence in their abilities or a particular situation. Confidence is a state of mind characterized by a belief in oneself, one's abilities, and one's judgment. Confidence is not the absence of doubt, fear, or uncertainty but rather the ability to manage these emotions and push forward towards goals despite them. A confidence factor 128 may be measured using the behavioral and biometric signals of associated with user. A confidence factor 128 may be generated as a function of each industrial prompt 116 or response a user gives. Confidence factor 128 may be represented as a score used to reflect the current confidence of the user. A non-limiting example, of a numerical scale, may include a scale from 1-10, 1-100, 1-1000, and the like, wherein a rating of 1 may represent a user with poor confidence, whereas a rating of 10 may represent a user with extreme confidence. A confidence factor 128 may be represented using linguistic values. Examples of linguistic values may include, "Poor confidence," "Average confidence," "Good confidence," "Excellent confidence," and the like. In some embodiments, a numerical score range may be represented by a linguistic value. As used in the current disclosure, a "numerical score range" is a range of scores that are associated with a linguistic value. For example, this may include a score of 0-2 representing "Poor confidence" or a score of 8-10 representing "Excellent confidence." A user's Excellent confidence may be scored by classifying the current physiological response data 120 to examples of confidence factors 128 from third parties who are similarly situated by their biometric signals, age, sex, social status, profession, and the like.

With continued reference to FIG. 1, a numerical score range representing confidence factor 128 may be adjusted using linguistic values. Processor 104 may adjust the numerical score range according to the level of confidence associated with the user. A numerical score range may be determined by comparing the current physiological response data 120 of the user to previous iterations of the numerical score ranges. Previous iterations' numerical score ranges may be taken from users who are similarly situated to the current user by confidence, biometric signals, height, weight, gender, nationality, lifestyle choices, age, and the like. Previous iterations of a numerical score range may be received from database 300. A numerical score range may be generated using a range machine learning model. As used in the current disclosure, a "range machine-learning model" is a machine-learning model that is used to generate a numerical score range. The range machine-learning model may be consistent with the machine-learning model described below in FIG. 2. Inputs to the range machine-learning model may include a user profile 108, physiological data 112, industrial prompts 116, digital avatars, physiological response data 120, examples of numerical score ranges, and the like. Outputs to the range machine-learning model may include a numerical score range. Range training data is a plurality of data entries containing a plurality of inputs that are correlated to a plurality of outputs for training a processor by a machine-learning process to correlate confidence factor 128 to examples of numerical score ranges. Range training data may comprise a plurality of confidence factors 128 correlated to examples of numerical scores. Range training data may be received from database 300. Range training data may contain information about user profile 108, physiological data 112, industrial prompts 116, digital avatars, physiological response data 120, examples of numerical score ranges, and the like. Range training data may be configured to correlate confidence factor 128 to examples of numerical score ranges. The machine learning model may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may generate the confidence factor 128 using a confidence machine-learning model 132. As used in the current disclosure, a "confidence machine-learning model" is a machine-learning model that is configured to generate confidence factor 128. Confidence machine-learning model 132 may be consistent with the machine-learning model described below in FIG. 2. Inputs to the confidence machine-learning model 132 may include user profile 108, physiological data 112, industrial prompts 116, digital avatars, physiological response data 120, numerical score range, examples of confidence factors 128, and the like. Outputs to the confidence machine-learning model 132 may include a confidence factor 128 tailored to the physiological response data 120. Confidence training data is a plurality of data entries containing a plurality of inputs that are correlated to a plurality of outputs for training a processor by a machine-learning process. In an embodiment, confidence training data may comprise a plurality of physiological response data 120 correlated to examples of confidence factors 128. Confidence training data may be received from database 300. Confidence training data may contain information regarding user profiles 108, physiological data 112, industrial prompts 116, digital avatars, physiological response data 120, numerical score range, examples of confidence factors 128, and the like. Machine learning model may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, confidence machine-learning model 132 may greatly enhance the functionality of software for generating and improving a confidence factor related to a user. By leveraging large datasets and advanced algorithms, confidence machine-learning model 132 can analyze patterns, extract insights, and make accurate predictions based on user behavior and preferences. This enables software to generate a confidence factor 128 that reflects the likelihood or reliability of specific outcomes or recommendations for the user. Through continuous learning and adaptation, confidence machine-learning model 132 may dynamically update the confidence factor 128 based on real-time data. This enables software to provide personalized and contextually relevant results, improving user satisfaction and engagement. Machine learning also enables software to identify and analyze complex relationships and dependencies that may be difficult for traditional rule-based systems to capture. As a result, the generated confidence factor 128 becomes more accurate and reliable, empowering users to make informed decisions based on trustworthy insights and predictions.

With continued reference to FIG. 1, processor 104 may be configured to update the training data of the confidence machine-learning model 132 using user inputs. A confidence machine-learning model 132 may use user input to update its training data, thereby improving its performance and accuracy. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, the accuracy of a plurality of confidence factors may be averaged to determine an accuracy score. In some embodiments, an accuracy score may be determined for a particular user. Accuracy score or another score as described above may indicate a degree of retraining needed for a machine-learning model such as a classifier; processor 104 may perform a larger number of retraining cycles for a higher number (or lower number, depending on a numerical interpretation used), and/or may collect more training data for such retraining.

With continued reference to FIG. 1, a machine-learning model, such as confidence machine-learning model 132, may be implemented as a fuzzy inferencing system. As used in the current disclosure, a "fuzzy inference" is a method that interprets the values in the input vector (i.e., a plurality of physiological response data 120 and examples of confidence factor 128.) and, based on a set of rules, assigns values to the output vector. A set of fuzzy rules may include a collection of linguistic variables that describe how the system should make a decision regarding classifying an input or controlling an output. An example of linguistic variables may include variables that represent one or more confidence factors 128. Examples of linguistic variables may include terms such as "Poor Confidence," "Moderate Confidence," and "Excellent Confidence," and "Overconfidence." Physiological response data 120 and examples of confidence factors 128 may each individually represent a fuzzy set. The confidence factor 128 may be determined by a comparison of the degree of match between a first fuzzy set and a second fuzzy set, and/or single values therein with each other or with either set, which is sufficient for purposes of the matching process.

Still referring to FIG. 1, the confidence factor 128 may be determined as a function of the intersection between two fuzzy sets. Ranking the confidence factor 128 may include utilizing a fuzzy set inference system as described herein below, or any scoring methods as described throughout this disclosure. For example, without limitation processor 104 may use a fuzzy logic model to determine confidence factor 128 as a function of fuzzy set comparison techniques as described in this disclosure. In some embodiments, each piece of information associated with a plurality of physiological response data 120 may be compared to one or more examples of confidence factor 128, wherein confidence factor 128 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare physiological response data 120 and an example of confidence factor 128 with a goal of generating confidence factor 128 specific to the user profile 108. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

Still referring to FIG. 1, the processor may be configured to generate a machine-learning model, such as confidence machine-learning model 132, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as confidence machine-learning model 132, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $l=\sqrt{\sum_{i=1}^{n}a_i^2}$, where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 is configured to generate confidence improvement data 136 as a function of the confidence factor 128. As used in the current disclosure, "confidence improvement data" is data related to a set of instructions configured to improve confidence factor of the user. Confidence improvement data 136 refers to any data or information that can be used to measure and track an individual's progress in improving their confidence levels as represented by a confidence factor 128. Such data can be gathered through various methods, including self-reporting, behavioral observation, physiological measures, biometric signals. In an embodiment, confidence improvement data 136 may include a plurality of tasks that will augment the confidence factor 128 in a favorable manner. This may include one or more remedial tasks such as educating the user regarding the cause of the undesirable confidence factor 128. These tasks may include positive affirmations, visualizations, power posing, practice, removing negative thoughts, and the like. These tasks may be presented to the user using a display device 140. In a non-limiting example, confidence improvement data 136 may suggest drills or tasks that will help the user's confidence factor 128 improve from a 4 to a 7. Confidence improvement data 136 may additionally suggest areas where a user needs to improve their confidence. Examples of areas may include depth of knowledge, public speaking, relatability, nervousness, improving eye contact, improving nervous movements (i.e. leg bounce, twitching, etc.), speaking with confidence, and the like. In some embodiments, confidence improvement data 136 may include instructions on how to improve users' confidence. Examples of instructions may include practicing in a mirror, memorizing study materials, improving diction, and the like.

With continued reference to FIG. 1, a processor 104 may track the user's confidence over time using the confidence factor 128 and confidence improvement data. After the confidence improvement data 136 has been implemented on a user, the user may be exposed to additional industrial prompts 116 to create additional confidence factors 128. This may be implemented using a feedback loop. In an embodiment, the user is constantly given confidence improvement data 136 for each industrial prompt 116 until he/she consistently achieves a desired confidence factor 128. A processor 104 may compare the user's current confidence factor 128 to historical versions of the user's confidence factor 128 to track the user's confidence factor over time 128. Processor 104 may track the user confidence factor 128 after exposure to each industrial prompt 116. In some embodiments, each confidence factor 128 may be plotted in a graphical manner prior to each exposure to an industrial prompt 116. The graphical representation of a plurality of confidence factors 128 may be used to display how the confidence factor 128 changes over time. Processor 104 may generate multiple trendlines and curves that describe how the confidence factor changes over time.

With continued reference to FIG. 1., processor 104 may determine confidence improvement data 136 using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include previous examples of confidence improvement data 136 correlated to confidence factors 128. In another embodiment, Data within the lookup table may include previous examples of confidence improvement data 136 correlated to physiological response data 120 and industrial prompts 116. Data within the lookup table may be received from database 300. Lookup tables may also be used to identify confidence improvement data 136 by matching an input value to an output value by matching the input against a list of valid (or invalid) items in an array. In a non-limiting example, confidence factor 128 may comprise an identification that the user has poor confidence. Examples of confidence improvement data 136 may indicate that users with poor confidence should commit to 20 hours of practice per week. Processor 104 may look up the user's confidence factor 128 and physiological response data 120 as inputs and output confidence improvement data 136. The output of the lookup table may comprise confidence improvement data 136. Data from the lookup table may be compared to examples of confidence improvement data 136, for instance, and without limitation using string comparisons, numerical comparisons such as subtraction operations, or the like; discrepancies may indicate data faults. Alternatively or additionally, a query representing elements of confidence improvement data 136 may be submitted to the lookup table and/or a database, and an associated data fault identifier stored in a data record within the lookup table and/or database may be retrieved using the query.

Still referring to FIG. 1, processor 104 may be configured to display the confidence improvement data 136 using a display device 140. As used in the current disclosure, a "display device" is a device that is used to display content. A display device 140 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, a display device 140 may include a virtual reality (VR) device. For the purposes of this disclosure, "virtual reality device" is an artificial computer-generated environment that simulates a three-dimensional space or world, which can be experienced by a user as if the user were actually there. The virtual reality device may be implemented in any suitable display device 140 disclosed in the entirety of this disclosure. As a non-limiting example, the display device 140 may include a virtual reality in a headset of a wearable device. The virtual reality device may alternatively or additionally be implemented using a display, which may display any data disclosed herein in the entirety of this disclosure including a digital avatar, as described in further detail above. Persons skilled in the art, upon reviewing the entirety of this disclosure, will be aware of various optical projection and/or display technologies that may be incorporated in virtual reality device consistently with this disclosure.

With continued reference to FIG. 1, a display device 140 may include an augmented reality (AR) device. An "augmented reality device," as used in this disclosure, is a device that permits a user to view a typical field of vision of the user and superimposes virtual images on the field of vision. The augmented reality device may be implemented in any suitable display device 140 disclosed in the entirety of this disclosure. As a non-limiting example, the display device 140 may include an augmented reality in a mobile phone of a personal device. As another non-limiting example, the display device 140 may include an augmented reality in a smart watch of the personal device. The augmented reality device may alternatively or additionally be implemented using a display, which may display any data disclosed herein in the entirety of this disclosure including a digital avatar, as described in further detail above. Persons skilled in the art, upon reviewing the entirety of this disclosure, will be aware of various optical projection and/or display technologies that may be incorporated in augmented reality device consistently with this disclosure.

Figure 2:
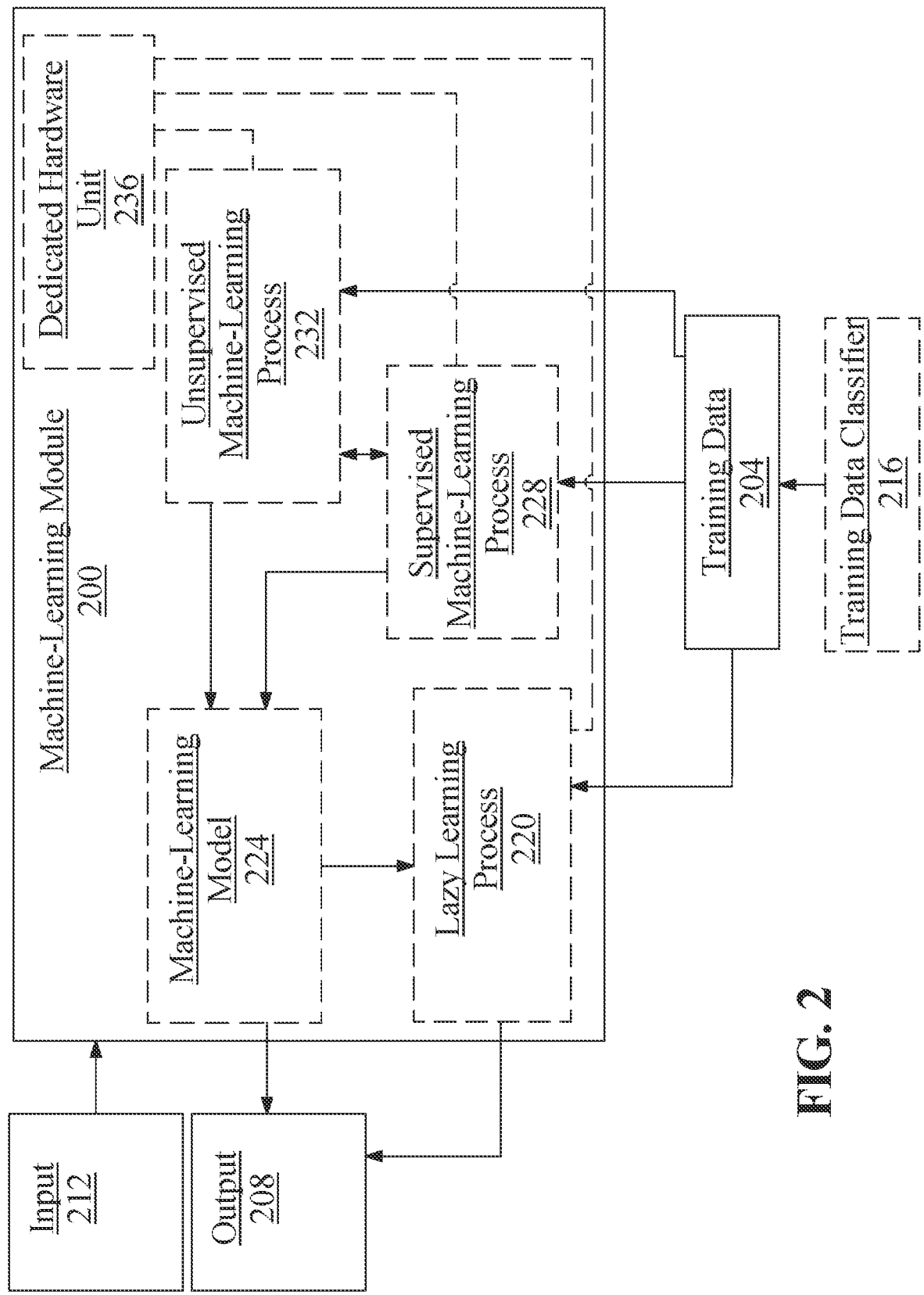
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example a plurality of physiological response data 120 as inputs and confidence factors 128 as outputs.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to according to the user's information, such as age, gender, education, health, weight, job experience, knowledge of topic, and the like. In another non-limiting example, training data classifier 216 may classify elements of training data to according to a user's initial confidence level.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user profile 108, physiological data 112, industrial prompts 116, digital avatars, physiological response data 120, numerical score range, examples of confidence factors 128, and the like as described above as inputs, and confidence factors 128 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
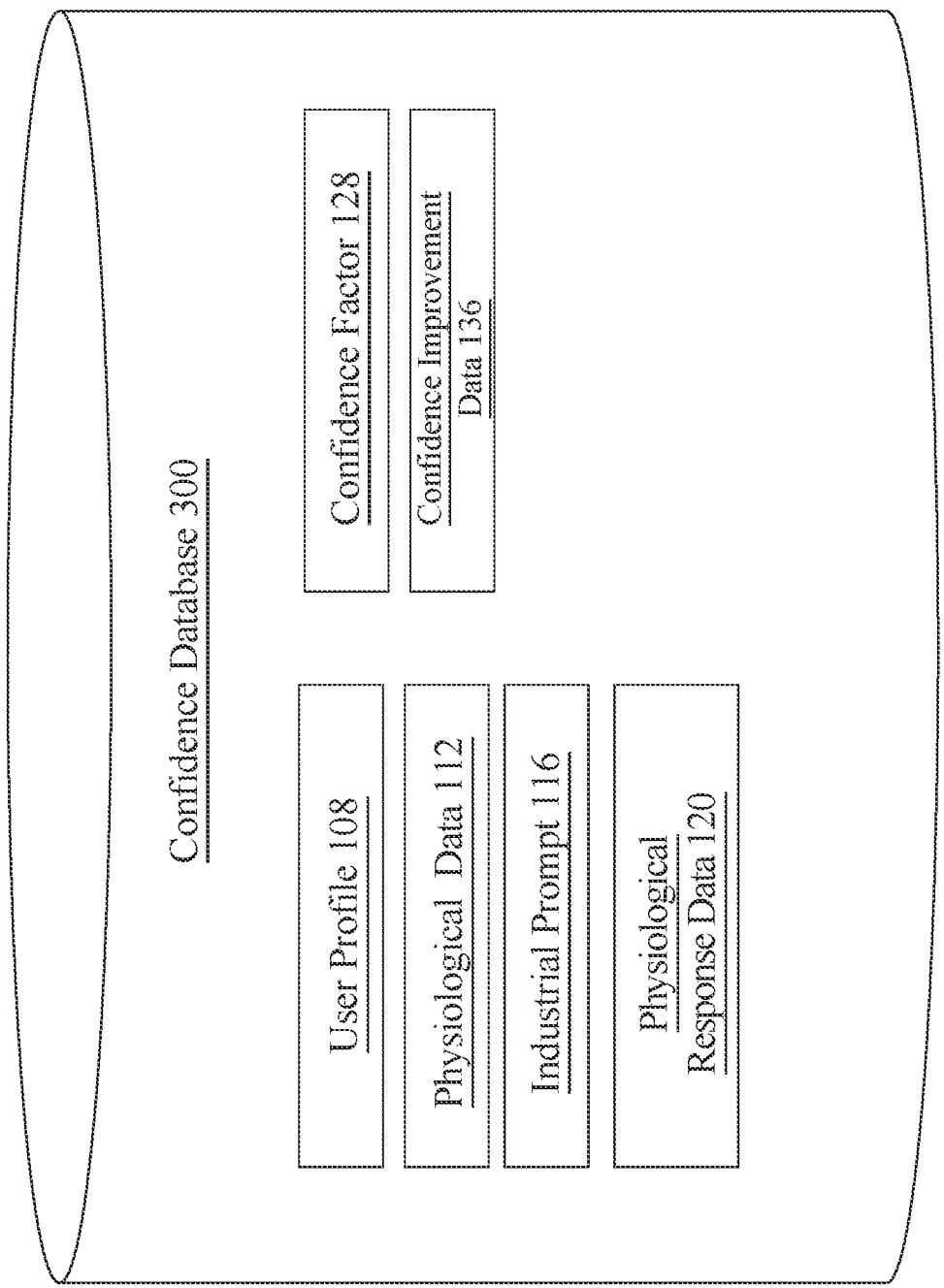
FIG. 3 is a block diagram of an exemplary embodiment of a confidence database.

Now referring to FIG. 3, an exemplary confidence database 300 is illustrated by way of block diagram. In an embodiment, any past or present versions of data disclosed herein may be stored within user profiles 108, physiological data 112, industrial prompts 116, digital avatars, physiological response data 120, numerical score ranges, confidence factors 128, confidence improvement data 132, and the like. Processor 104 may be communicatively connected with confidence database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Confidence database 300 may be implemented, without limitation, as a relational database, a key-value retrieval database such as a NOSQL database, or any other format or structure for use as a database that a person skilled in the art would recognize as suitable upon review of the entirety of this disclosure. Confidence database 300 may alternatively or additionally be implemented using a distributed data storage protocol and/or data structure, such as a distributed hash table or the like. Confidence database 300 may include a plurality of data entries and/or records as described above. Data entries in a database may be flagged with or linked to one or more additional elements of information, which may be reflected in data entry cells and/or in linked tables such as tables related by one or more indices in a relational database.

Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
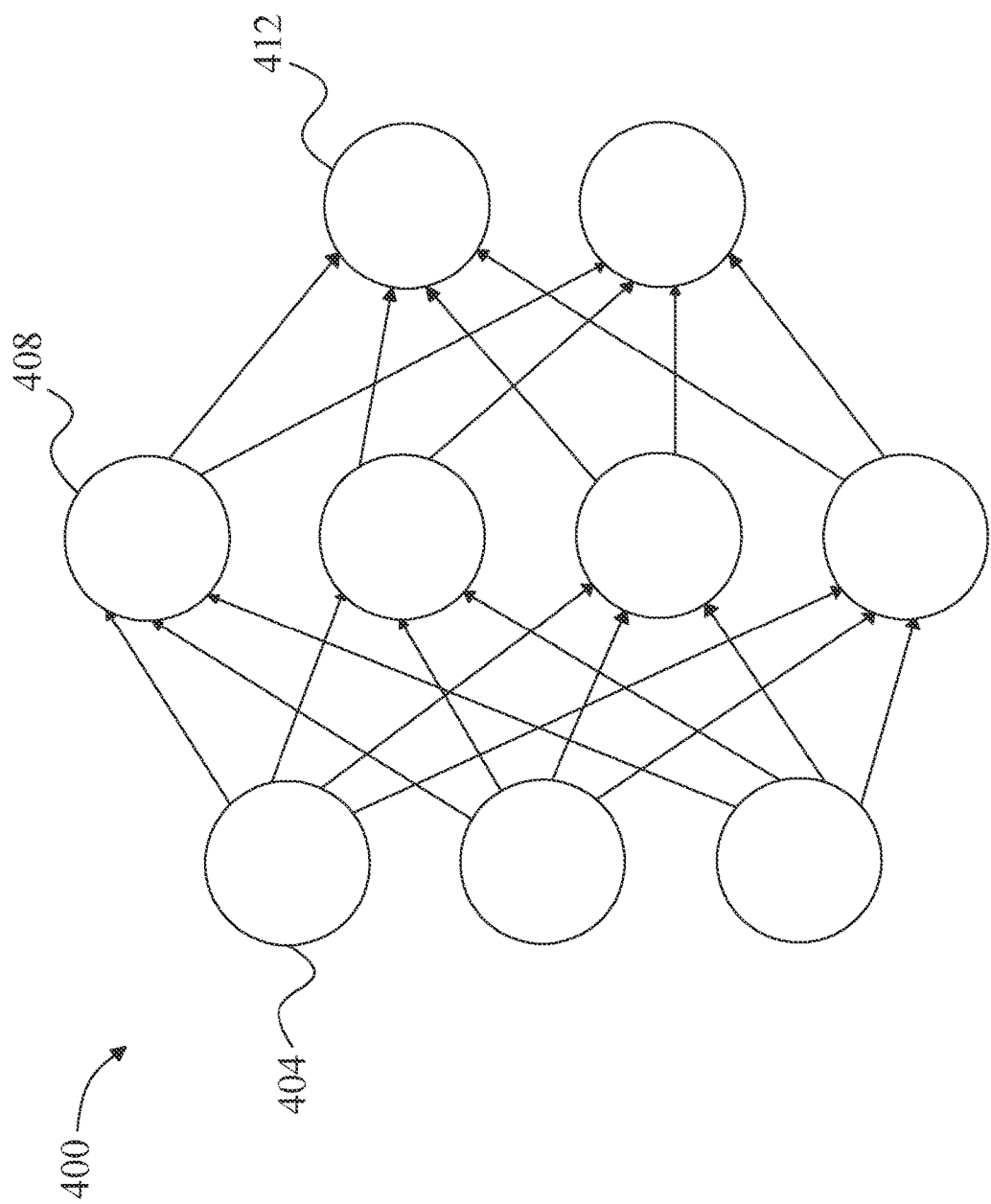
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
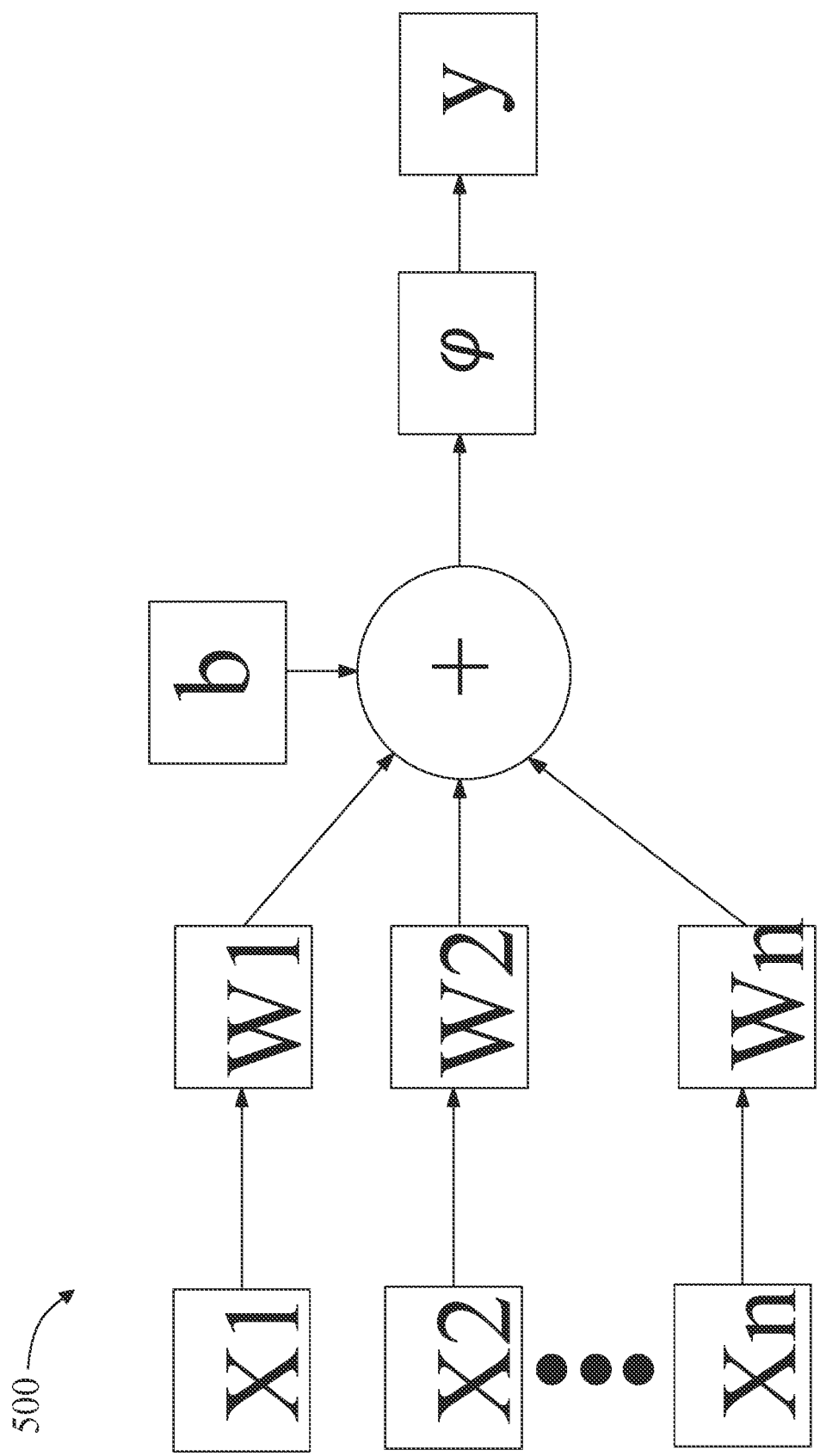
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
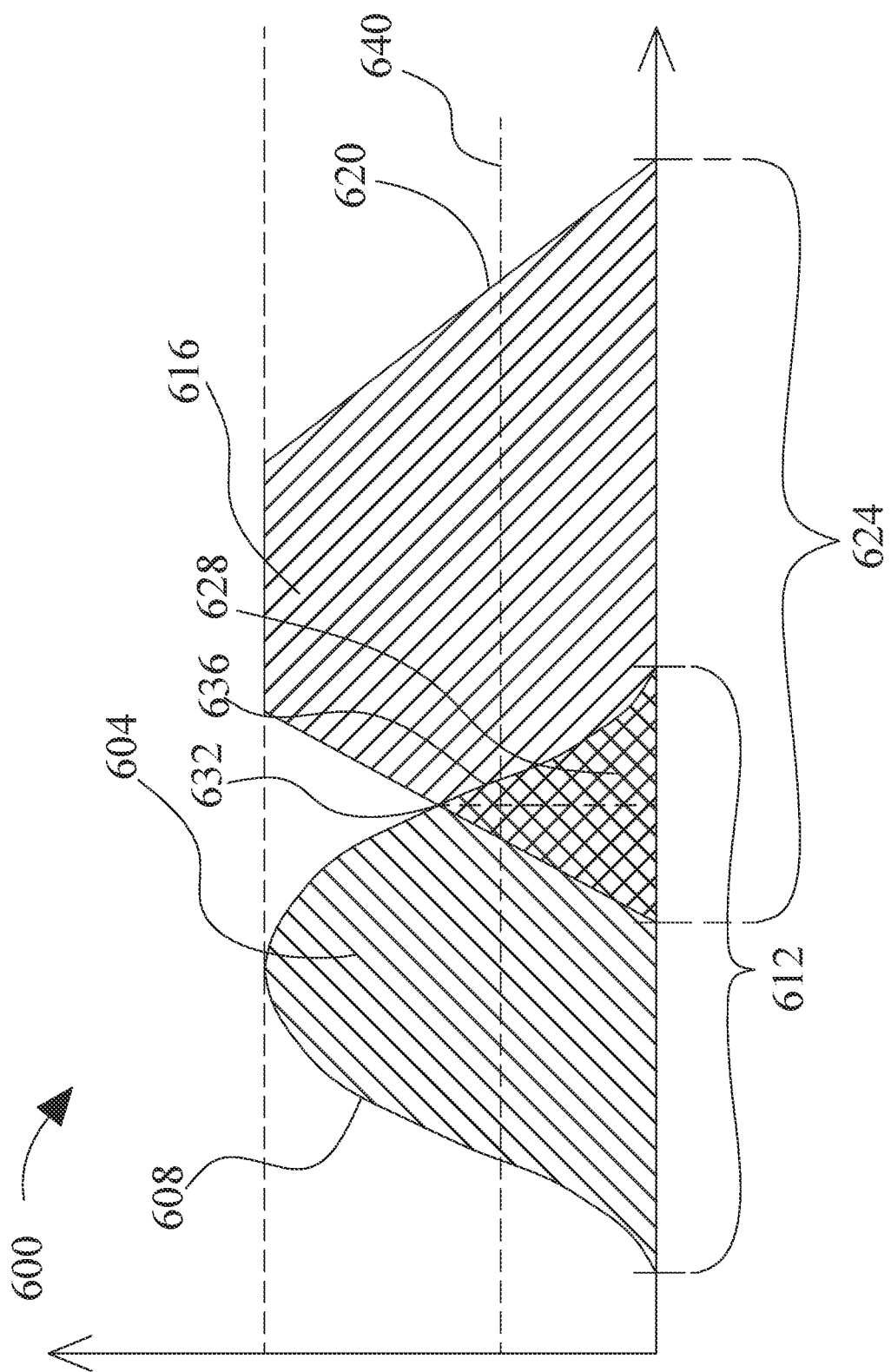
FIG. 6 an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a plurality of physiological response data 120 and an example of a confidence factor 128 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a plurality of physiological response data 120 and an example of confidence factor 128. For instance, an acceptance variable may represent a first measurable value pertaining to the classification of a plurality of physiological response data 120 to an example of confidence factor 128. Continuing the example, an output variable may represent a confidence factor 128 tailored to the user profile 108. In an embodiment, a plurality of physiological response data 120 and/or an example of confidence factor 128 may be represented by their own fuzzy set. In other embodiments, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x < c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a plurality of physiological response data 120 and an example of confidence factor 128. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, a confidence factor 128 may indicate a sufficient degree of overlap with fuzzy set representing a plurality of physiological response data 120 and an example of confidence factor 128 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a plurality of physiological response data 120 and an example of a confidence factor 128 have fuzzy sets, a confidence factor 128 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
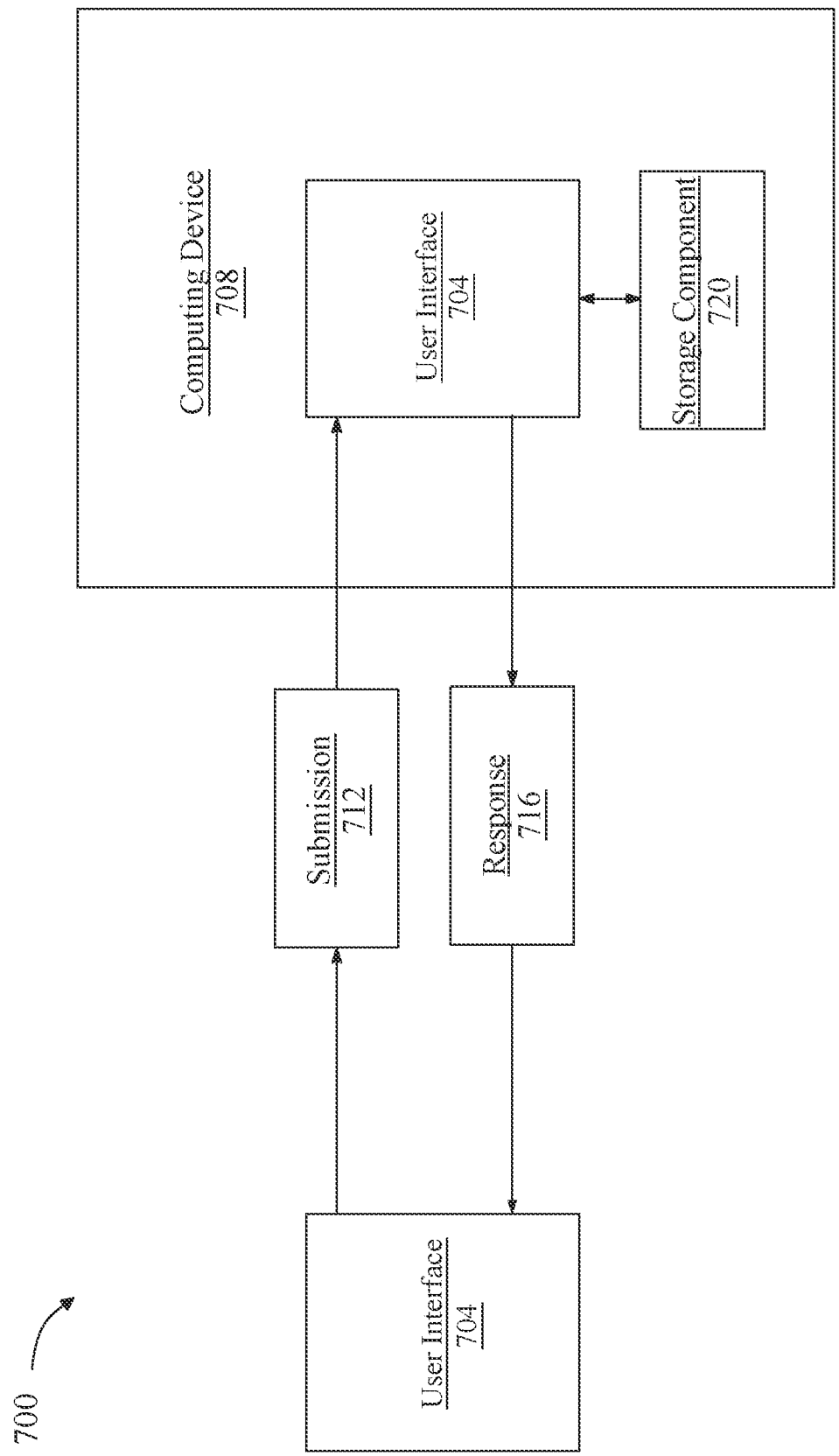
FIG. 7 is an illustration of an exemplary embodiment of a chatbot.

Referring to FIG. 7, a chatbot system 700 is schematically illustrated. As used in the current disclosure, a "chatbot" is a software application that aims to mimic human conversation through text or voice interactions. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 7112 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
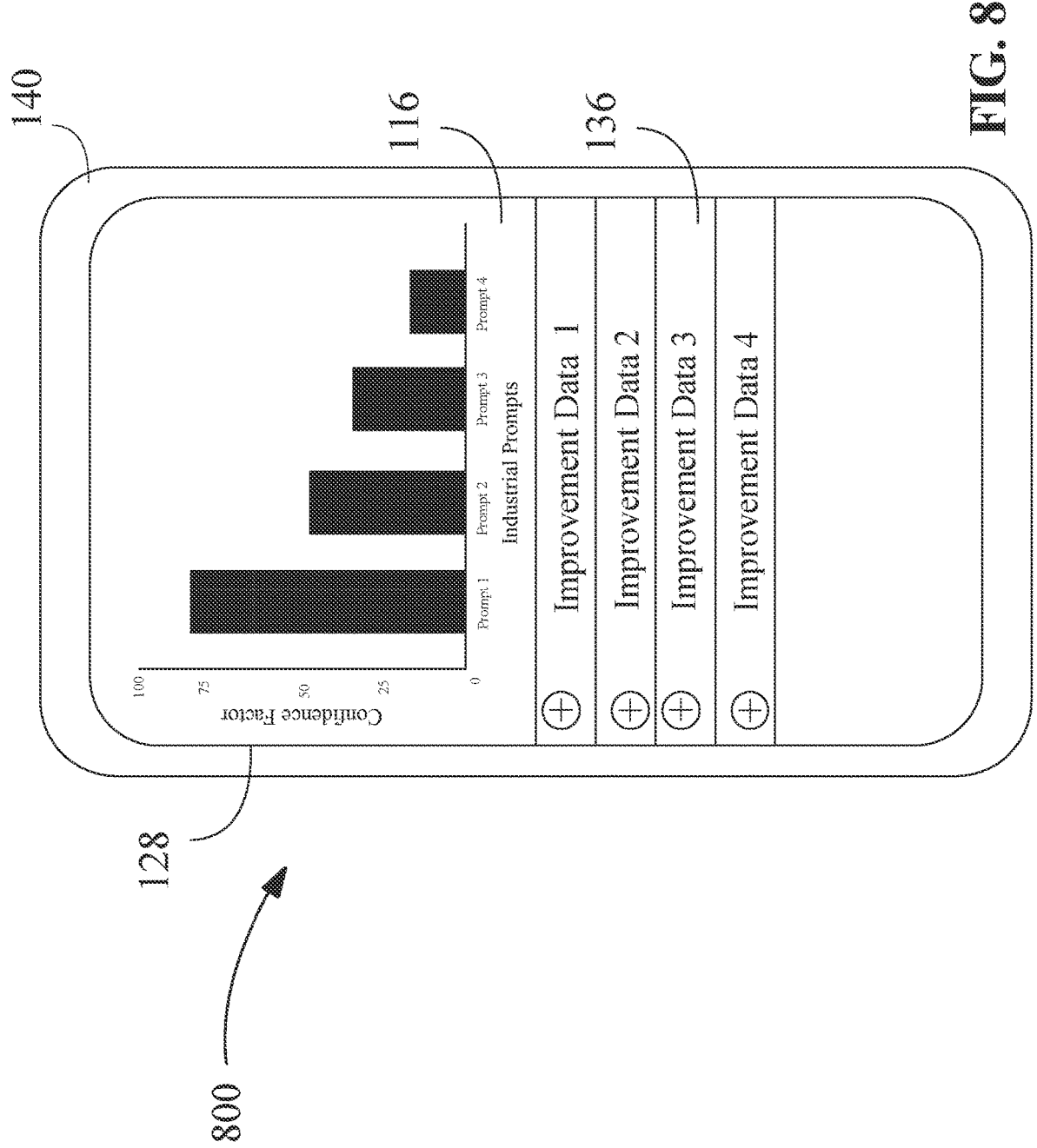
FIG. 8 is a diagram of an exemplary embodiment of a user interface.

Now referring to FIG. 8, an exemplary representation of a user interface 800 component is presented. User interface 800 may include a display device such as display device 140. In an embodiment, user interface 800 may display a user profiles 108, physiological data 112, industrial prompts 116, digital avatars, physiological response data 120, numerical score range, confidence factor 128, and/or confidence improvement data 132. A user interface may display any data disclosed within the entirety of this disclosure. The confidence factor 128 may be displayed graphically for each industrial prompt 116. A confidence factor 128 may display the improvement or a reduction in the confidence of a user. The confidence factor 128 may be displayed using bar charts, line graphs, dot graphs, trend lines, among other graphs. The confidence factor 128 may be reflected as a percentage of confidence in the user's confidence. A listing of confidence improvement data 132 may comprise an identification of the area in which the user needs to improve and a set of instructions on how the user should improve. In an embodiment, user interface 800 may display a detailed account of how the confidence factor 128 is generated as a function of the physiological response data 120. In an example, without limitations, user interface 800 may display a graphical representation of the physiological response data 120. This may include trendlines depicting how the user's biometric signals are improving and the rate at which they are improving. In some embodiments, user interface 800 may display a plurality of questions which require the user to enter information regarding the user profile 108 and user data. User interface 800 may present a user with questions to generate the user profile 108.

Figure 9:
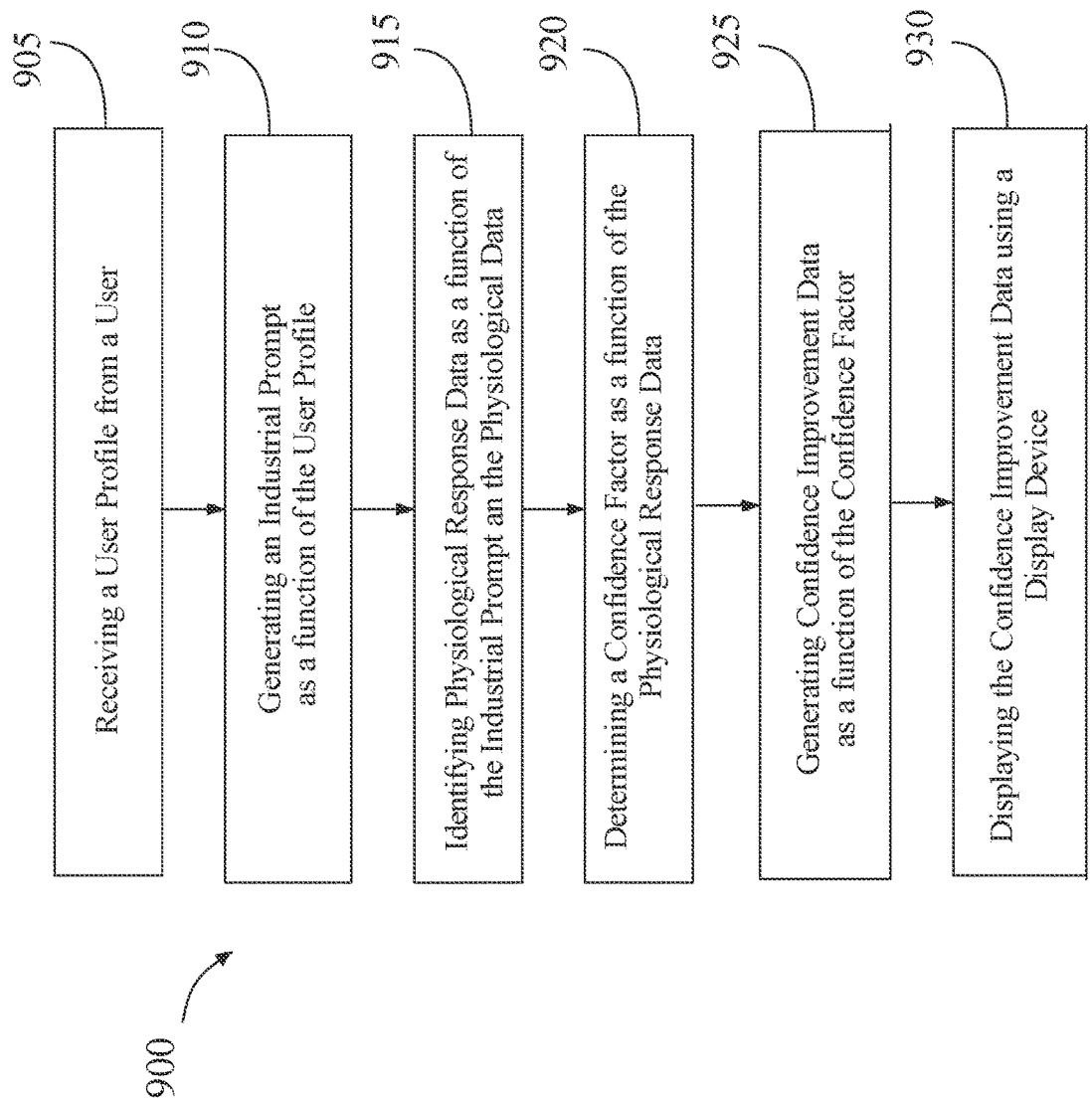
FIG. 9 is a flow diagram of an exemplary method for the generation and improvement of a confidence factor.

Referring now to FIG. 9, a flow diagram of an exemplary method 900 for the generation and improvement of a confidence factor is illustrated. At step 905, method 900 includes receiving, using at least the processor, a user profile from a user, wherein the user profile comprises physiological data. This may be implemented as described and with reference to FIGS. 1-9. In some embodiments, extracting the user profile may comprise extracting the user profile using a Web crawler or a chatbot. In another embodiment, extracting the user profile may comprise extracting the user profile using at least a sensor, wherein the at least a sensor comprises a wearable device or an eye sensor.

Still referring to FIG. 9, at step 910, method 900 includes generating, using the at least the processor, an industrial prompt as a function of the user profile. This may be implemented as described and with reference to FIGS. 1-9. In an embodiment, method may further comprise generating, using the at least a processor, a digital avatar as a function of the industrial prompt.

Still referring to FIG. 9, at step 915, method 900 includes identifying, using the at least the processor, physiological response data as a function of the industrial prompt and the plurality of physiological data. This may be implemented as described and with reference to FIGS. 1-9. In an embodiment, the method further may further comprise generating, using the at least a processor, a digital avatar as a function of the industrial prompt. The digital avatar may comprise a chatbot.

Still referring to FIG. 9, at step 920, method 900 includes determining, using the at least the processor, a confidence factor as a function of the biometric response data. This may be implemented as described and with reference to FIGS. 1-9. In an embodiment, determining the confidence factor comprises determining the confidence factor using a confidence machine-learning model. The confidence machine-learning model may be configured to be trained using confidence training data, wherein the confidence training data contains a plurality of data entries containing the physiological response data as inputs correlated to the confidence factor as outputs. The confidence machine-learning model may be configured to determine the confidence factor as a function of the physiological response data using the confidence machine-learning model. In an embodiment, wherein determining the confidence factor may comprise determining the confidence factor using a fuzzy inference.

Still referring to FIG. 9, at step 925, method 900 includes generating, using the at least the processor, confidence improvement data as a function of the confidence factor. This may be implemented as described and with reference to FIGS. 1-9.

Still referring to FIG. 9, at step 930, method 900 includes displaying, using a display device, the confidence improvement data. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM"

device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
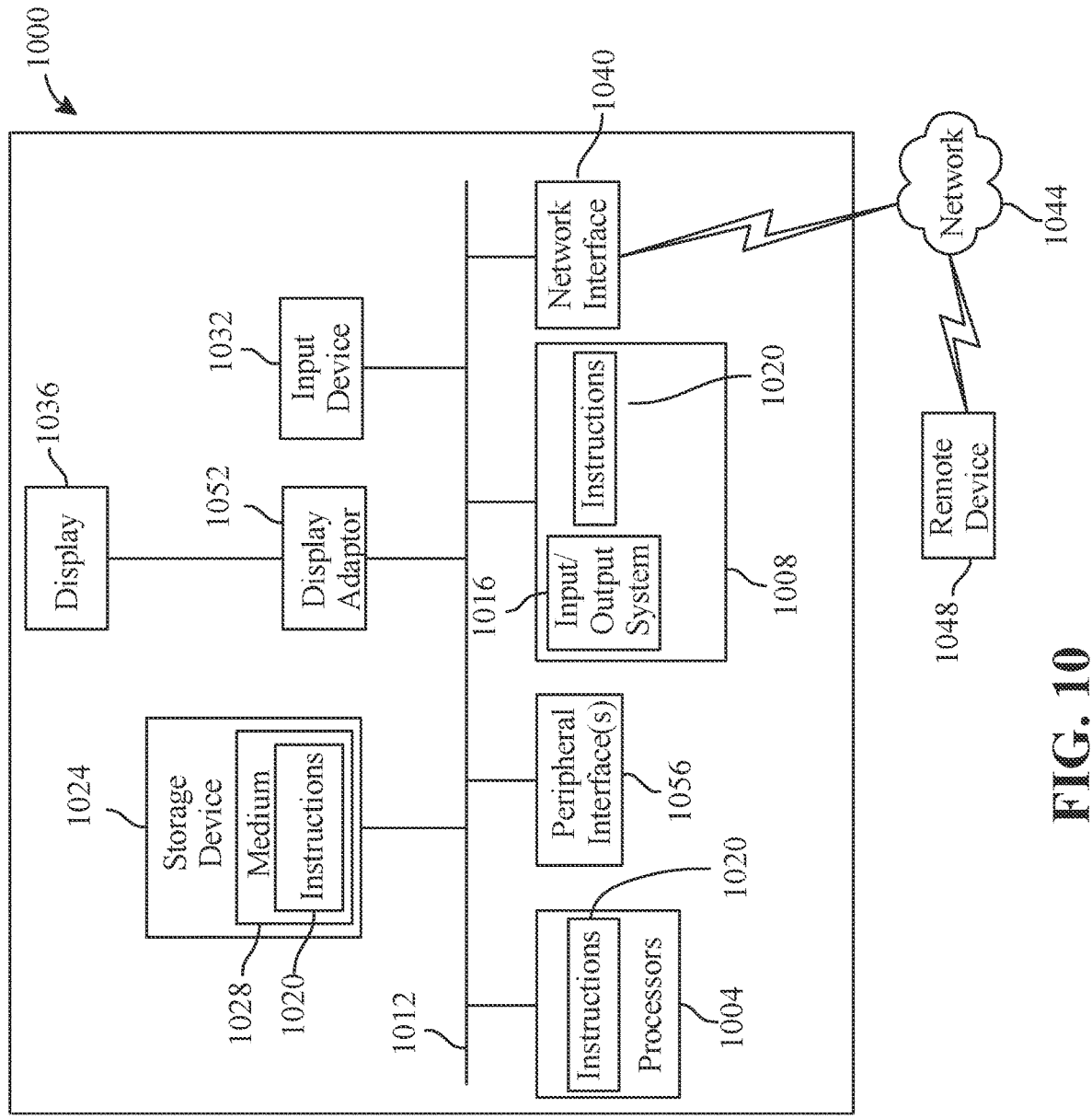
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a generation and improvement of a confidence factor, wherein the apparatus comprises:
    at least one processor; and
    a memory communicatively connected to the at least one processor, wherein the memory containing instructions configuring the at least one processor to:
        generate a user profile for a user, wherein the user profile comprises a plurality of physiological data, wherein generating the user profile comprises generating a query comprising at least a search criteria received from the user;
        generate an industrial prompt as a function of the user profile, wherein the industrial prompt comprises a staged scenario with a customizable computer-generated digital avatar configured to simulate a conversation with a user;
        identify physiological response data as a function of the industrial prompt and the plurality of physiological data;
        determine a confidence factor as a function of the physiological response data, wherein the confidence factor comprises a numerical score of a numerical score range that represents level of confident of the user;
        generate confidence improvement data as a function of the confidence factor; and display the confidence improvement data using a display device.

2. The apparatus of claim 1, wherein identifying the physiological response data comprises identifying the physiological response data using at least a sensor.

3. The apparatus of claim 1, wherein the at least a sensor comprises a wearable device.

4. The apparatus of claim 1, wherein the at least a sensor comprises an eye sensor.

5. The apparatus of claim 1, wherein the confidence factor is represented using a numerical scale.

6. The apparatus of claim 1, wherein determining the confidence factor comprises determining the confidence factor using a confidence machine-learning model.

7. The apparatus of claim 6, wherein determining the confidence factor using the confidence machine-learning model comprises:
    training the confidence machine-learning model using confidence training data, wherein the confidence training data contains a plurality of data entries containing the physiological response data as inputs correlated to the confidence factor as outputs; and
    determining the confidence factor as a function of the physiological response data using the confidence machine-learning model.

8. The apparatus of claim 1, wherein determining the confidence factor comprises determining the confidence factor using a fuzzy inference.

9. The apparatus of claim 1, wherein the memory contains instructions further configuring the processor to prompt the user to respond to the industrial prompt using the customizable computer-generated digital avatar and a chatbot.

10. A method for a generation and improvement of a confidence factor, wherein the method comprises:
    generating, using at least one processor, a user profile for a user, wherein the user profile comprises a plurality of physiological data, wherein generating the user profile comprises generating a query comprising at least a search criteria received from the user;
    generating, using the at least the processor, an industrial prompt as a function of the user profile, wherein the industrial prompt comprises a staged scenario with a customizable computer-generated digital avatar configured to simulate a conversation with a user wherein the industrial prompt comprises a staged scenario with a customizable computer-generated digital avatar configured to simulate a conversation with a user;
    identifying, using the at least one processor, physiological response data as a function of the industrial prompt and the plurality of physiological data;
    determining, using the at least the processor, a confidence factor as a function of the physiological response data, wherein the confidence factor comprises a numerical score of a numerical score range that represents level of confident of the user;

generating, using the at least one processor, confidence improvement data as a function of the confidence factor; and displaying, using a display device, the confidence improvement data.

11. The method of claim 10, wherein the method further comprises identifying the physiological response data comprises identifying the physiological response data using at least a sensor.

12. The method of claim 10, wherein the at least a sensor comprises a wearable device.

13. The method of claim 10, wherein the at least a sensor comprises an eye sensor.

14. The method of claim 10, wherein the confidence factor is represented using a numerical scale.

15. The method of claim 10, wherein the method further comprises determining the confidence factor comprises determining the confidence factor using a confidence machine-learning model.

16. The method of claim 15, wherein determining the confidence factor using the confidence machine-learning model comprises:

training the confidence machine-learning model using confidence training data, wherein the confidence training data contains a plurality of data entries containing the physiological response data as inputs correlated to the confidence factor as outputs; and determining the confidence factor as a function of the physiological response data using the confidence machine-learning model.

17. The method of claim 10, wherein the method further comprises determining, using the at least a processor, the confidence factor using a fuzzy inference.

18. The method of claim 10, further comprising prompting, by the at least a processor, the user to respond to the industrial prompt using the customizable computer-generated digital avatar and a chatbot.

* * * * *